US008056406B2

(12) United States Patent
Goto et al.

(10) Patent No.: US 8,056,406 B2
(45) Date of Patent: Nov. 15, 2011

(54) SIMULATION WHEEL AND VEHICLE TESTING APPARATUS

(75) Inventors: Yuichi Goto, Chofu (JP); Daisuke Kawano, Chofu (JP); Koji Sato, Yokohama (JP); Kentaro Echigo, Yokohama (JP)

(73) Assignee: Independent Administrative Institution National Traffic Safety and Environment Laboratory, Chofu-shi, Tokyo (JP)

( * ) Notice: Subject to any disclaimer, the term of this patent is extended or adjusted under 35 U.S.C. 154(b) by 119 days.

(21) Appl. No.: 12/616,645

(22) Filed: Nov. 11, 2009

(65) Prior Publication Data

US 2010/0122574 A1    May 20, 2010

(30) Foreign Application Priority Data

Nov. 18, 2008   (JP) .................................. 2008-294144

(51) Int. Cl.
    *G01M 17/02*    (2006.01)
(52) U.S. Cl. ...................................... 73/117.01; 73/146
(58) Field of Classification Search .. 73/117.01–117.03, 73/146
    See application file for complete search history.

(56) References Cited

U.S. PATENT DOCUMENTS

| 4,475,383 A  * | 10/1984 | Fischer et al. ................... 73/146 |
| 4,499,759 A  * | 2/1985  | Hull ............................... 73/146 |
| 4,862,736 A  * | 9/1989  | Treitz ........................ 73/117.01 |
| 4,862,738 A  * | 9/1989  | Jankowski ................. 73/115.07 |
| 5,072,611 A  * | 12/1991 | Budd et al. ................. 73/115.07 |
| 5,241,856 A  * | 9/1993  | Petersen et al. ............ 73/118.01 |
| 5,465,615 A  * | 11/1995 | Petersen et al. ............ 73/115.07 |
| 6,729,178 B2 * | 5/2004  | Leska et al. ..................... 73/146 |
| 7,254,995 B2 * | 8/2007  | Leska et al. ..................... 73/146 |
| 7,461,556 B2 * | 12/2008 | Hamilton ......................... 73/669 |
| 7,716,996 B2 * | 5/2010  | Muller et al. ............. 73/862.044 |
| 7,921,713 B2 * | 4/2011  | Czoka et al. .............. 73/117.03 |

FOREIGN PATENT DOCUMENTS

| DE | 3507906 A1 | 9/1986 |
| DE | 4136508 A1 | 5/1993 |

OTHER PUBLICATIONS

O. Sokki "Flexible Automatic Measuring System," FAMS-8000, Aug. 2008.
European Search Report dated Aug. 4, 2011, issued in corresponding European Patent Application No. 09174944.0.

* cited by examiner

*Primary Examiner* — Freddie Kirkland, III
(74) *Attorney, Agent, or Firm* — Westerman, Hattori, Daniels & Adrian, LLP

(57)    ABSTRACT

A shaft receiving section of a simulation wheel is attached to a hub of a vehicle such that the shaft receiving section is located outside the vehicle. A tire mounting section surrounding the shaft receiving section concentrically with the shaft receiving section with a bearing being interposed between the shaft receiving section and the tire mounting section and further surrounding the peripheral surface of the hub to allow a tire to be mounted at a portion surrounding the peripheral surface of the hub is provided. The tire is mounted on the tire mounting section. The shaft receiving section is made rotatable with the rotation of the tire mounting section being stopped. Load is applied to an axle from a dynamometer.

3 Claims, 6 Drawing Sheets

RELATED ART

SIMULATION WHEEL AND VEHICLE TESTING APPARATUS

BACKGROUND OF THE INVENTION

1. Field of the Invention

The present invention relates to a simulation wheel used in a vehicle testing apparatus for measuring power transmitted from an engine to an axle, and the vehicle testing apparatus.

2. Description of the Related Art

Among vehicle running tests, there is a test for measuring how power is transmitted from an engine to an axle during running.

A chassis dynamometer is often used for performing the vehicle running test. However, when the chassis dynamometer is used, it is necessary to fix a vehicle. Thus, the test is performed with a suspension, a damper or the like not being in operation. In this case, it is not possible to perform the test with the suspension, the damper or the like operating to simulate a state in which an actual vehicle is running.

Thus, in order to perform the test with the suspension, the damper or the like operating as in the state in which the actual vehicle is running, a low inertia dynamometer (referred to as dynamometer below) may be used instead of the chassis dynamometer to perform the running test.

Conventionally, when the running test is performed by using such a dynamometer, the suspension, the damper, and even the brake or the like are removed, and a measurement bearing is attached to an axle to measure the state of power transmission from an engine to the axle. However, it is recently attempted to develop a configuration to measure the state of power transmission from the engine to the axle by use of the bearing without removing the suspension, the damper, the brake or the like. If such a configuration can be developed, it would become possible to accurately perform the test on how the power is transmitted from the engine to the axle while the suspension, the damper or the like remain attached and are further brought into an operating state.

FIG. 1 is a view illustrating an example of the configuration of such a bearing 21.

As shown in FIG. 1, one end of a joint 22 is coupled to a fixed-type bearing 21 to which an axle is coupled and which is fixedly installed on a floor at a measurement location. The other end of the joint 22 is further coupled to an unillustrated dynamometer. With the configuration, the test can be directly performed without bothering to remove a brake BR or the like of a vehicle.

In the configuration, however, both the position and inclination of a rotating center axis of the axle are fixed by the bearing 21, and the movements of a suspension, a damper or the like are restricted. Thus, an axle state during running cannot be recreated.

Furthermore, with the configuration in FIG. 1, it is not possible to perform the test on how the power transmitted to the axle is changed when the influence of a tire operating in conjunction with the suspension and the damper is also taken into consideration.

The present invention provides a simulation wheel capable of simulating an axle state while an actual vehicle is running on a road, and a vehicle testing apparatus capable of performing a test on how a state of power transmitted from an engine to an axle is changed while applying load from a dynamometer by using the simulation wheel.

SUMMARY OF THE INVENTION

A simulation wheel of the present invention to achieve the above-described object includes:

a shaft receiving section having a hub attachment structure attached to a hub of a wheel of a vehicle instead of a wheel with a tire, and a joint attachment structure on an outer surface side to which a joint is attached; and a tire mounting section surrounding the shaft receiving section concentrically with the shaft receiving section with a bearing being interposed between the shaft receiving section and the tire mounting section, and further surrounding a peripheral surface of the hub to allow a tire to be mounted at a portion surrounding the peripheral surface of the hub; the shaft receiving section being rotatable with rotation of the tire mounting section being stopped.

With the simulation wheel according to the present invention, the shaft receiving section provided in the simulation wheel can be attached to the hub of the vehicle in a similar manner to the attachment of a normal wheel with a tire. Therefore, it is not necessary to remove a suspension, a damper, a brake or the like.

The same type of tire as that of the actual vehicle can be mounted in a non-rotating state on the tire mounting section provided surrounding the shaft receiving section with the bearing being interposed between the shaft receiving section and the tire mounting section. Accordingly, a test can be performed by simulating a tire state that serves a function of absorbing vibrations transmitted from an engine to an axle during running in addition to the mechanisms such as the suspension and the damper during the vehicle test.

Furthermore, by attaching the joint, for example, a constant velocity joint to the joint attachment structure on the outer surface side of the shaft receiving section to couple the simulation wheel to a dynamometer, the same load as that applied to the axle during running can be applied to the axle from the dynamometer.

It is preferable that the simulation wheel further includes a key coupling mechanism for coupling the shaft receiving section and the tire mounting section by using a detachable key to restrict relative rotation between the shaft receiving section and the tire mounting section, thereby allowing the vehicle to run with the shaft receiving section and the tire mounting section being coupled by using the key.

A test location where a vehicle is tested, and a storage location where a vehicle is stored are usually distant from each other. Therefore, the key is brought into a coupling state to allow a test vehicle to run itself from the storage location to the test location, and the key is removed after the test vehicle has been transferred to the test location to perform the test. After the test has been performed, the key is brought into the coupling state again to allow the test vehicle to run itself back to the storage location.

A vehicle testing apparatus of the present invention to achieve the above-described object includes:

a simulation wheel comprising: a shaft receiving section having a hub attachment structure attached to a hub of a wheel of a vehicle instead of a wheel with a tire, and a joint attachment structure on an outer surface side to which a joint is attached, and a tire mounting section surrounding the shaft receiving section concentrically with the shaft receiving section with a bearing being interposed between the shaft receiving section and the tire mounting section, and further surrounding a peripheral surface of the hub to allow a tire to be mounted at a portion surrounding the peripheral surface of the hub, the shaft receiving section being rotatable with rotation of the tire mounting section being stopped;

a constant velocity joint whose one end is attached to the shaft receiving section; and a dynamometer to which the other end of the constant velocity joint is attached to transmit torque to the shaft receiving section via the constant velocity joint.

With the vehicle testing apparatus, the test of simulating the running state of the actual vehicle can be performed by attaching the tire in a similar manner to that of the actual vehicle in addition to the suspension, the damper or the like.

As described above, there are provided the simulation wheel capable of simulating an axle state while the actual vehicle is running on a road, and the vehicle testing apparatus capable of performing the test on how the state of power transmitted from the engine to the axle is changed while applying the load from the dynamometer by using the simulation wheel.

DETAILED DESCRIPTION OF THE PREFERRED EMBODIMENT

In the following, an embodiment of the present invention will be described with reference to the drawings.

Figure 1:
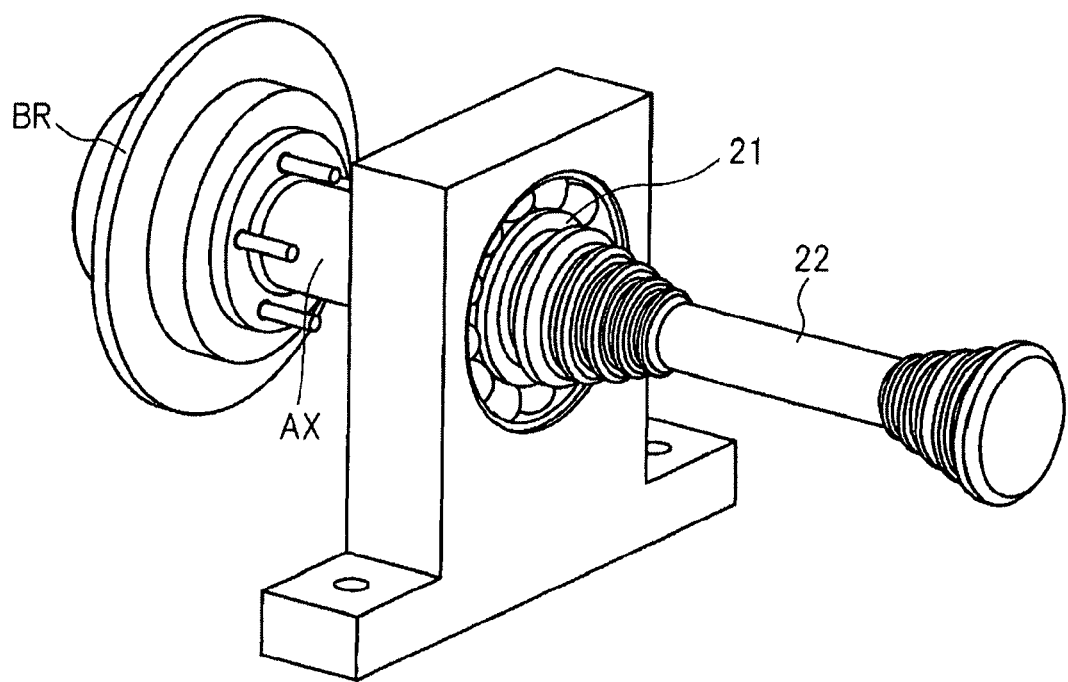
FIG. 1 is a view illustrating a configuration of a conventional bearing.
Figure 2:
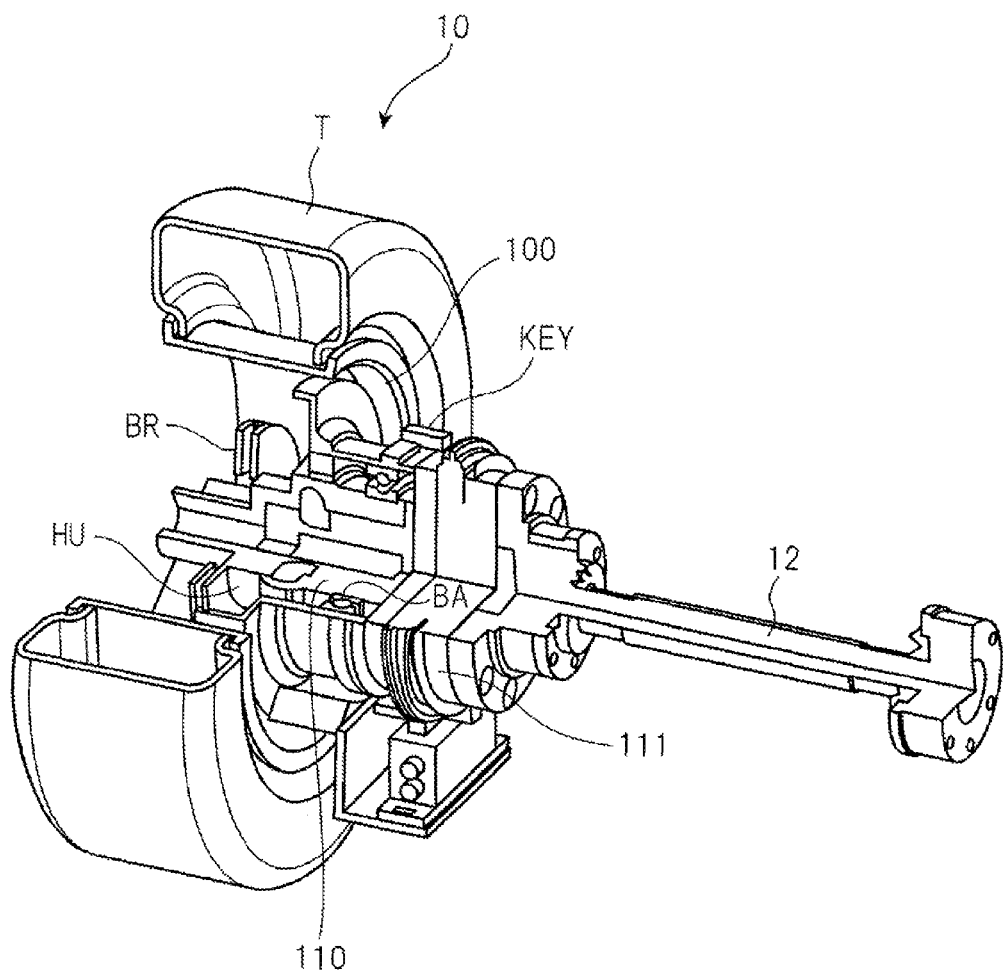
FIG. 2 is a view illustrating an embodiment of a simulation wheel according to the present invention.
Figure 3:
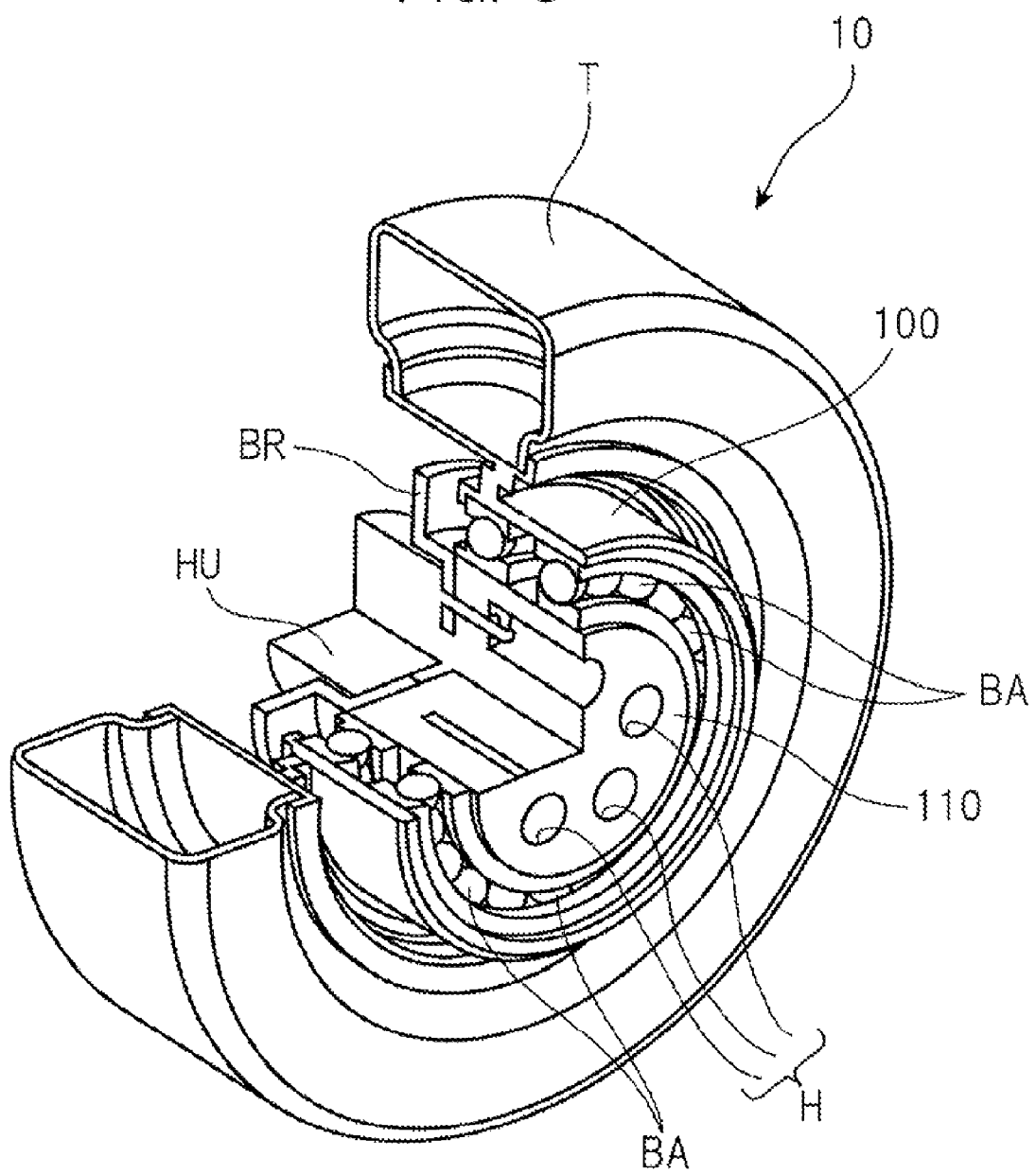
FIG. 3 is a view illustrating the embodiment of a simulation wheel according to the present invention.
Figure 4:
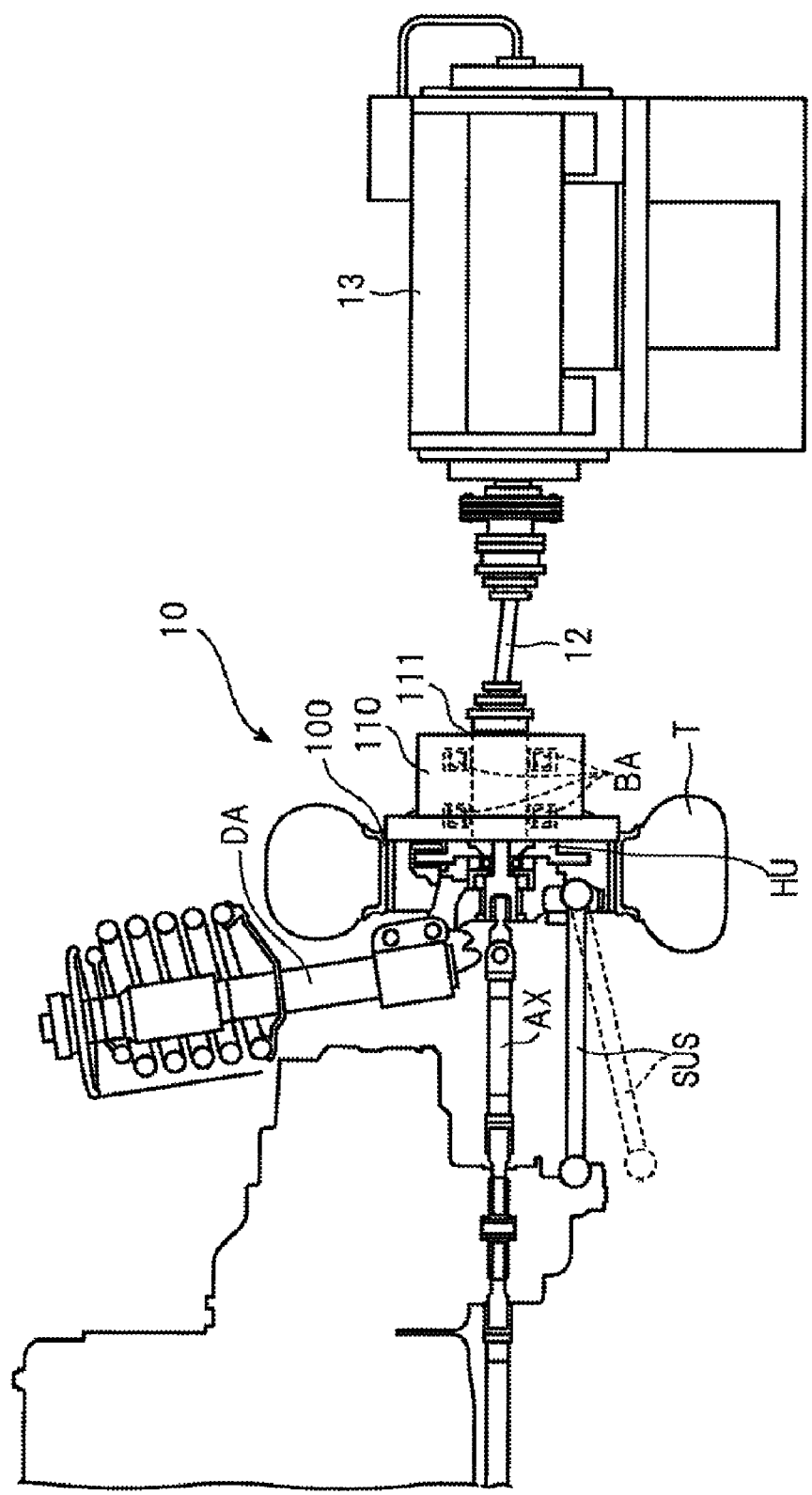
FIG. 4 is a view illustrating a configuration of a vehicle testing apparatus 1 where the simulation wheel in FIGS. 2 and 3 is employed.

FIGS. 2 and 3 are views illustrating an embodiment of a simulation wheel 10 according to the present invention. FIG. 4 is a view illustrating a configuration of a vehicle testing apparatus 1 where the simulation wheel 10 in FIGS. 2 and 3 is employed.

FIG. 2 illustrates a state in which a constant velocity joint 12 is coupled to the simulation wheel 10 as viewed from diagonally above. FIG. 3 illustrates the simulation wheel 10 as viewed from diagonally above. FIG. 4 schematically illustrates the configuration of the vehicle testing apparatus 1.

The configuration of the simulation wheel 10 will be described with reference to FIGS. 2 to 4.

The simulation wheel 10 includes a tire mounting section 100 and a shaft receiving section 110 as shown in FIGS. 2 to 4.

The shaft receiving section 110 of the simulation wheel 10 in FIGS. 2 to 4 includes a hub attachment structure attached to a hub HU of a wheel of a vehicle (see FIG. 4) instead of a wheel with a tire. An example in which plural hub holes H into which hub bolts of the hub are inserted are provided as the hub attachment structure is employed here.

As is clear from FIGS. 2 to 4, the shaft receiving section 110 is provided projecting outward so as to be located outside the vehicle when attached to the hub HU. Thus, the simulation wheel 10 according to the present embodiment can be easily attached to the hub HU of the vehicle (see FIG. 4) that is exposed with the wheel with a tire being removed from the vehicle.

The tire mounting section 100 is provided surrounding the peripheral surface of the hub HU to allow a tire T to be mounted at a portion surrounding the peripheral surface of the hub HU. Accordingly, the tire T can be mounted at the same position as a position where the tire of the actual vehicle is mounted, so that a vehicle state can be brought into substantially the same state as that during running on a road when an axle is rotating by receiving power from an engine.

A joint attachment structure 111 is further provided on the outer surface side of the shaft receiving section 110 of the simulation wheel 10. Therefore, after attaching the simulation wheel 10 to the hub HU of the vehicle by using the hub attachment structure (the hub holes H), an operator needs only to attach one end of the constant velocity joint 12 to the joint attachment structure 111 and couple the other end to a dynamometer 13, so that the vehicle testing apparatus 1 shown in FIG. 4 can be easily formed.

As described above, the simulation wheel 10 can be attached to the vehicle without removing the mechanisms such as a suspension SUS, a damper DA, and a brake BR of the actual vehicle as shown in FIG. 4. Accordingly, there is an advantage that the operation of an operator is simplified. Also, in addition to the suspension SUS, the damper DA or the like of the actual vehicle, the tire T can be configured in a similar manner to that of the actual vehicle. Accordingly, a test can be performed by recreating the state in which the actual vehicle is running, and applying load torque to an axle AX from the dynamometer 13.

Next, the relationship between the tire mounting section 100 and the shaft receiving section 110 of the simulation wheel 10 shown in FIGS. 2 to 4 will be described in detail.

A bearing BA is interposed between the tire mounting section 100 and the shaft receiving section 110 of the simulation wheel 10 as shown in FIG. 3. Thus, even when the shaft receiving section 110 is rotated, the tire mounting section 100 is not rotated. The tire can be thereby fixed without fixing the vehicle, and the test can be performed by applying the load torque to the axle AX from the dynamometer 13 with the mechanisms such as the suspension SUS and the damper DA while bringing the vehicle into an operating state similar to that of the actual vehicle.

The simulation wheel 10 according to the present embodiment is configured such that the shaft receiving section 110 is located outside the vehicle when the simulation wheel 10 is attached to the hub HU of the vehicle by using the hub attachment structure as described above. Accordingly, when the simulation wheel 10 according to the present embodiment is used, the simulation wheel 10 can be easily attached to the vehicle without removing the mechanisms such as the suspension SUS, the damper DA, and the brake, and without changing the tread (vehicle width) dimensions of the actual vehicle as in a conventional case.

The configuration in which the tire T is mounted in a similar manner to the actual vehicle by providing the tire mounting section 100 in the simulation wheel 10 is employed as described above. Therefore, when the suspension SUS moves vertically by receiving vibrations from the engine during the test performed by coupling the dynamometer 13 to the simulation wheel 10 via the constant velocity joint 12 as shown in FIG. 4, there is an advantage that displacement by the movement is absorbed by the deflection of the tire T in a similar manner to that during running. The shaft receiving section 110 fixed to the hub HU is supported on a floor surface at a measurement location via the tire T, the tire mounting section 100 and the bearing BA, so that the shaft receiving section 110 has a large tolerance for variation in the orientation of a rotating center axis. Therefore, the same state as that of the actual vehicle can be recreated even when the rotating axis direction of the hub HU is inclined with respect to a horizontal surface (a camber angle), or the inclination varies in accordance with the vertical movement of the vehicle, for example.

The simulation wheel 10 according to the present embodiment has the structure to be attached to the hub HU of the vehicle. Therefore, even when there is a difference in suspension type in each type of vehicle, there is an advantage that displacement by the movement in the camber direction and caster direction of the tire arising from the difference in suspension type can be absorbed by the deflection of the tire T by attaching the tire.

Furthermore, as is clear from the configuration of the vehicle testing apparatus 1 in FIG. 4, a difference between the axis center of the shaft receiving section 110 and the axis center of the dynamometer 13 at the time of mounting is absorbed by the constant velocity joint 12 that couples the simulation wheel 10 and the dynamometer 13. The constant velocity joint 12 further absorbs a difference between the axis center of the shaft receiving section 110 and the axis center of the dynamometer 13 when the shaft receiving section 110 of the simulation wheel 10 is vertically moved by receiving the vibrations from the engine during the test.

As described above, the shaft receiving section 110 is located outside the vehicle, and the tire T is allowed to be mounted on the tire mounting section 100. Accordingly, the actual load test can be performed by applying the load torque to the axle AX from the dynamometer 13 with the suspension SUS, the damper DA or the like being brought into the same operating state as that when the actual vehicle is running.

Lastly, in the present embodiment, in consideration of a fact that a test location where the test is performed on a test vehicle on which the simulation wheel 10 is mounted and a storage location of the test vehicle are usually distant from each other, a configuration to allow the test vehicle to be transferred to the test location from the storage location will be described.

Figure 5:
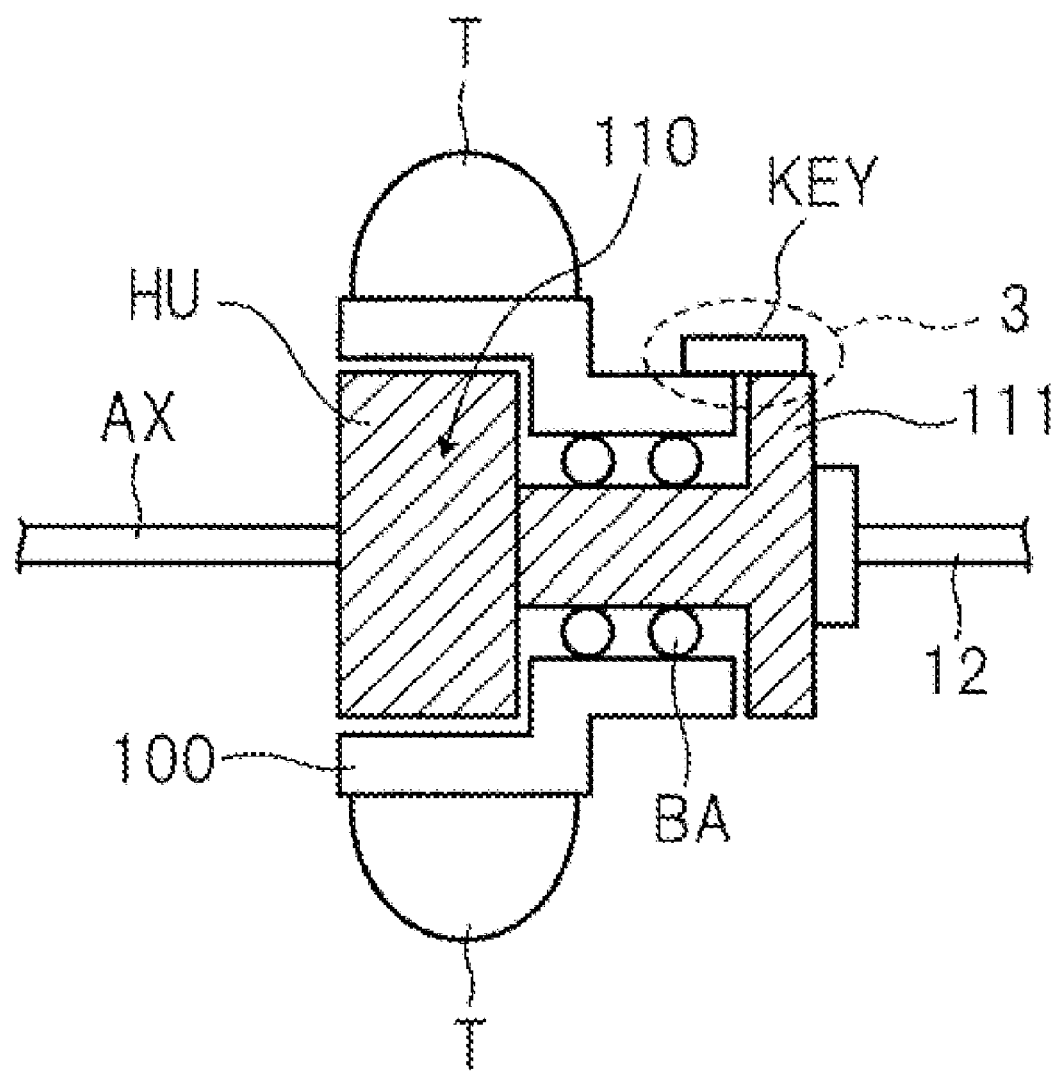
FIG. 5 is a view explaining a configuration of a key coupling mechanism 3 of a simulation wheel 10.
Figure 6:
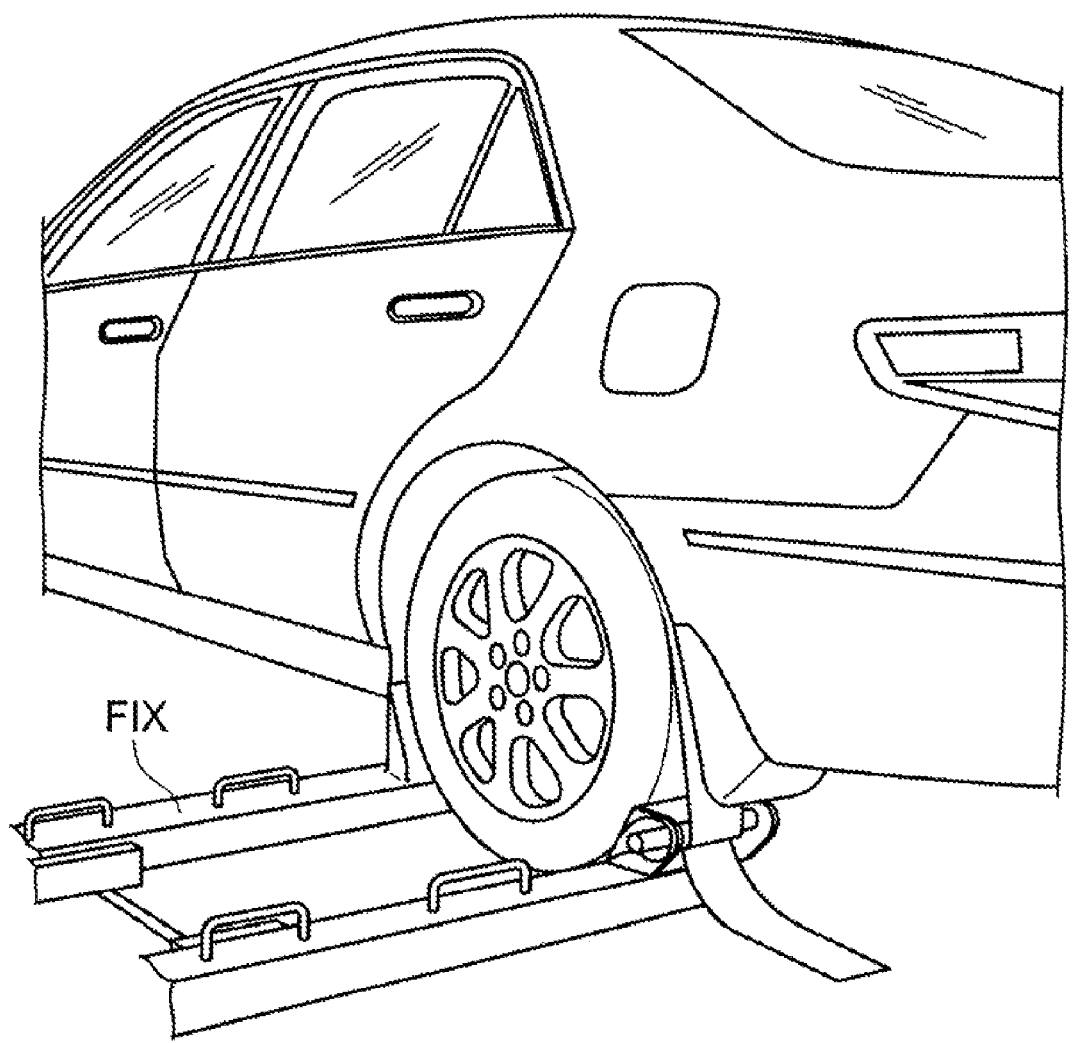
FIG. 6 is a view illustrating a fixture used in a conventional chassis dynamometer.

FIG. 5 is a view illustrating a key coupling mechanism for coupling the tire mounting section 100 and the shaft receiving section 110. FIG. 6 is a view illustrating a fixture FIX for fixing the simulation wheel at the time of the test.

FIG. 5 schematically illustrates a section of the simulation wheel 10 in FIG. 2. The configuration of a key coupling section 3 for coupling the tire mounting section 100 outside the bearing BA and the shaft receiving section 110 by using a key KEY is shown therein.

In this example, when the test vehicle is transferred from the storage location to the test location, the tire mounting section 100 is allowed to be rotated by a driving force from the hub HU by coupling the joint attachment structure 111 and the tire mounting section 100 by using the key KEY. During the test after the test vehicle is transferred to the test location, the key KEY is removed from the joint attachment structure 111, thereby preventing the tire mounting section 100 from being rotated.

With such a configuration, even when the hub HU is rotated during the test, the tire T is not rotated. Thus, the test can be performed with the vehicle being reliably fixed by using the figure FIX used in a chassis dynamometer as shown in FIG. 6. The test can be performed with the damper, the suspension, and the tire provided in the actual vehicle operating in a similar manner to that during running.

Also, even when the storage location and the test location of the actual vehicle are distant from each other, the key KEY is inserted into the key coupling mechanism 3 to allow the test vehicle to run itself to the test location where there is the dynamometer. Furthermore, after the vehicle is fixed by the fixture FIX, the test can be immediately performed by removing the key KEY.

As described above, there are provided the simulation wheel capable of simulating the axle state while the actual vehicle is running on a road, and the vehicle testing apparatus capable of performing the test on how the state of power transmitted from the engine to the axle is changed while applying the load from the dynamometer by using the simulation wheel.

What is claimed is:

1. A simulation wheel, comprising:
   a shaft receiving section that has a hub attachment structure attached to a hub of a wheel of a vehicle instead of a wheel with a tire, and a joint attachment structure on an outer surface side to which a joint is attached, the shaft receiving structure being rotated around a rotation axis by torque transmitted via the joint;
   a tire mounting section that surrounds the shaft receiving section concentrically with the rotation axis of the shaft receiving section, and further surrounds a peripheral surface of the hub to allow a tire to be mounted at a portion surrounding the peripheral surface of the hub; and
   a bearing that is interposed between the shaft receiving section and the tire mounting section, and that keeps the tire mounting section stopped without being rotated together with the shaft receiving section while the shaft receiving section is being rotated by the torque.

2. The simulation wheel according to claim 1, further comprising a key coupling mechanism for coupling the shaft receiving section and the tire mounting section by using a detachable key to restrict relative rotation between the shaft receiving section and the tire mounting section,
   wherein the detachable key, which couples the shaft receiving section and the tire mounting section, transmits rotation of the shaft receiving section to the tire mounting section and causes the tire mounting section to be rotated together with the shaft receiving section.

3. A vehicle testing apparatus comprising:
   a simulation wheel comprising:
      a shaft receiving section that has a hub attachment structure attached to a hub of a wheel of a vehicle instead of a wheel with a tire, and a joint attachment structure on an outer surface side to which a constant velocity joint is attached, the shaft receiving section being rotated around a rotation axis by torque transmitted via the constant velocity joint,
      a tire mounting section that surrounds the shaft receiving section concentrically with the rotation axis of the shaft receiving section, and further surrounds a peripheral surface of the hub to allow a tire to be mounted at a portion surrounding the peripheral surface of the hub, and
      a bearing that is interposed between the shaft receiving section and the tire mounting section, and that keeps the tire mounting section stopped without being rotated together with the shaft receiving section while the shaft receiving section is being rotated by the torque,
   the constant velocity joint whose one end is attached to the shaft receiving section; and
   a dynamometer to which the other end of the constant velocity joint is attached to transmit the torque to the shaft receiving section via the constant velocity joint.

* * * * *